UNITED STATES PATENT OFFICE.

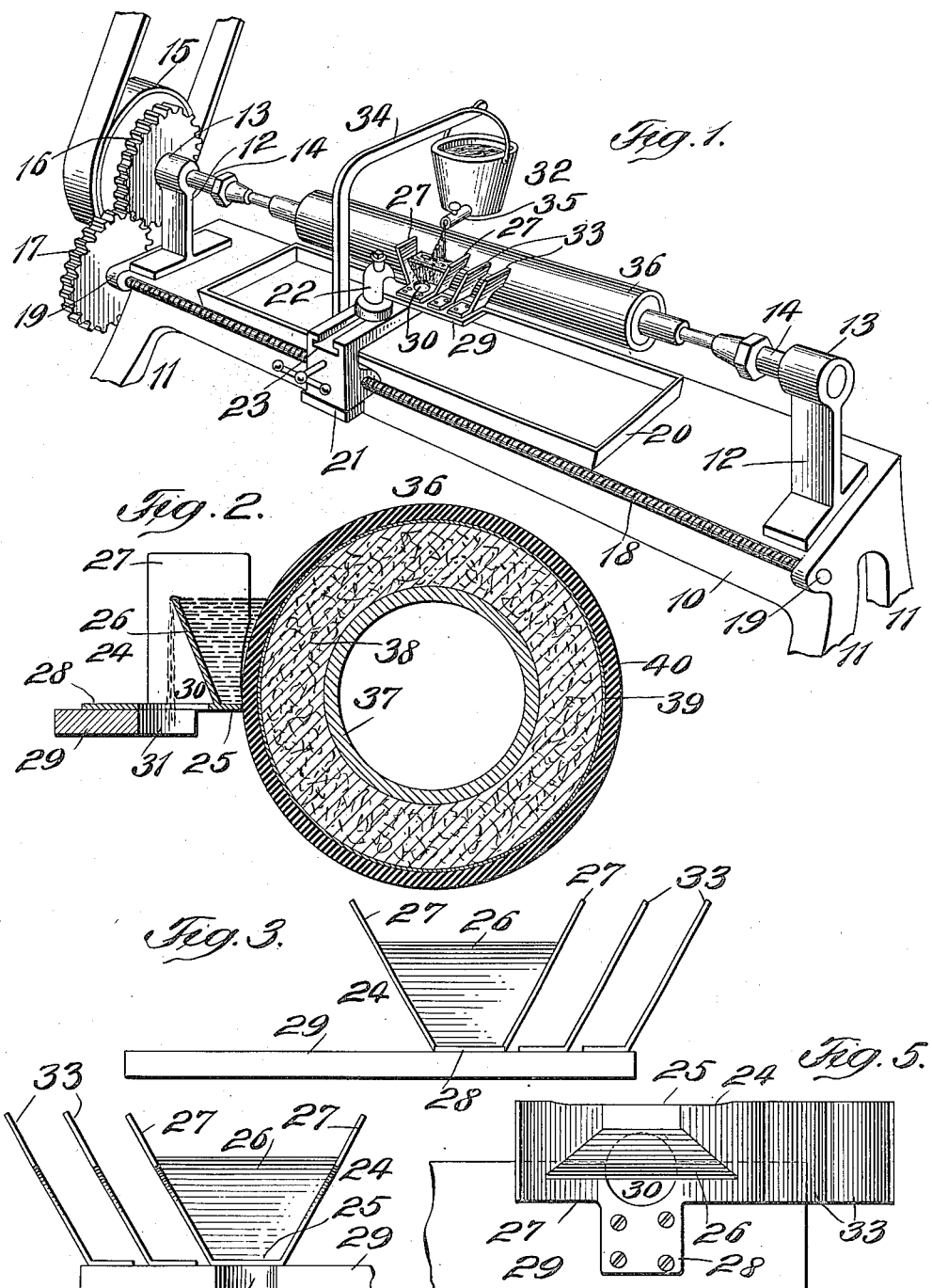

SAMUEL CRUMP, OF NEW YORK, N. Y., ASSIGNOR TO THE CRUMP COMPANY, OF NEW YORK, N. Y., A CORPORATION OF NEW YORK.

MANUFACTURE OF PRINTERS' ROLLERS.

1,141,320.

Specification of Letters Patent.

Patented June 1, 1915.

Application filed December 12, 1913. Serial No. 806,186.

*To all whom it may concern:*

Be it known that I, SAMUEL CRUMP, a citizen of the United States, and a resident of New York city, in the county of New York and State of New York, have invented certain new and useful Improvements in the Manufacture of Printers' Rollers, of which the following is a specification.

The invention resides in a novel method of manufacturing a complete printer's roller or resurfacing a printer's roller which has been in use and become inefficient or useless and requires restoration to its original condition.
One object of the invention is to enable the production of printers' rollers in which the rollers shall be true from end to end on the stock or in other words accurately centered throughout. It is commonly known that considerable difficulty has arisen due to rollers cast in molds not being properly centered, and one purpose of my invention is to obviate such difficulty by dispensing with the use of molds in the production of the rollers.

Another object of the invention is to provide an efficient method of manufacture by which the roller may be made up of several concentric layers of material differing in character and an improved roller produced thereby, as, for illustration, I may according to my invention apply a coating of any desired thickness of very strong printer's roller composition on the roller-stock or piece of piping and then a body of composition of less strength and much greater resiliency to complete the roller, or I may apply on the coating on the stock a body of suitable thickness of the composition treated with bichromate of ammonia so as to render it insoluble and then superimpose on this body a final coating, say about one-sixteenth of an inch in thickness, of regular printer's roller composition so that the roller may have the requisite tacky surface for taking the ink.

My invention may be utilized in applying a true surface coating to a worn roller regardless of its body-composition, and also an exterior surface layer or coating on a roller in course of manufacture and which, for illustration, might have a body portion of sponge rubber or other material.

In the drawings forming a part of this application, I illustrate the invention as em- ployed in applying an exterior coating on a roller whose body portion is formed of sponge rubber.

In carrying out my invention I depart from the casting of rollers in molds and provide a method of forming either the entire roller or the exterior of the roller by spirally spinning the composition, layer upon layer, on the stock or on the body which may already be on the stock, said layers each being formed of a spirally laid ribbon or width of the melted composition and the whole forming at the close of the operation a homogeneous accurately centered body or roller of improved character.

The invention will be fully understood from the detailed description hereinafter presented, reference being had to the accompanying drawings, in which:

Figure 1 is a perspective view, partly broken away, of a machine suited to the carrying out of the method of my invention, said machine being shown as in the operation of applying a coat to or building up a printer's roller; Fig. 2 is an enlarged vertical transverse section through the roller and the material holding receptacle; Fig. 3 is an enlarged front elevation of the receptacle detached from the machine; Fig. 4 is a detached view, partly broken away, of said receptacle, said view being the reverse of that shown in Fig. 3 and representing the receptacle as having its rear side turned around to the front, and Fig. 5 is a top view of a portion of the receptacle and its support.

In the drawings, 10 designates a suitable bed-plate or table mounted upon legs 11 and provided at its opposite ends with standards 12 having bearings 13 for spindles or shafts 14 of customary character in lathe work and therefore requiring no special description. One of the spindles 14, commonly known as the live spindle, has mounted on it a drive-wheel 15 and gear wheel 16, the latter being in mesh with a gear-wheel 17 secured upon the end of a horizontal screw 18 extending from one end to the other of the bed-plate 10 and mounted at its ends in bearings 19. Upon the table or bed-plate 10 is located a drip-pan 20 which is somewhat greater than the length of the printers' rollers to be coated with the use of the machine. Upon the screw 18 is mounted a frame 21 having a post 22 adjustably secured thereto, said frame 21 having an undercut groove 23 in its upper surface to receive the lower end of said post in a manner customary in lathe construction wherein tool posts are held upon their rests in a manner permitting them to be moved toward and retracted from the work.

Secured to the post 22 is a receptacle, numbered as a whole 24, embodying some of the principal features of the machine used by me. The receptacle 24 is open at its rear side, as shown in Fig. 2, and comprises a bottom 25, a front end 26, and corresponding sides 27, the latter converging downwardly to the bottom 25 and extending upwardly and frontwardly beyond the front end 26, as clearly shown in Figs. 2 and 3. The rear edges of the sides 27 of the receptacle are concaved in their lower portions, as shown in Fig. 2, and the bottom 25 of the receptacle is formed with a frontwardly extending section 28 by means of which the receptacle may be secured to a supporting plate 29, said plate being extended at one end and adapted to be detachably secured to the post 22. The extension 28 of the bottom of the receptacle is formed just in front of the front end 26 with a hole 30, and the plate 29 is below said hole cut out, as at 31. The front end 26 of the receptacle inclines downwardly and rearwardly and its upper edge is over the hole 30, and the frontwardly extending portions of the sides 27 converge downwardly to said hole 30 and the purpose of the hole is to permit any overflow of the solution from the receptacle to pass downwardly through the hole 30 and cut-away portion 31 in the plate 29 and fall into the drip pan 20. It is my purpose that the receptacle 24 shall, when in use, receive a substantially constant feed of the solution from the container or kettle 32 and that the overflow from said receptacle shall be directed to and permitted to escape through the hole 30. I shall preferably secure upon the plate 29 one or more metal blades or wings 33, which will correspond exactly with the adjacent side of the receptacle 24, being inclined and concaved at their rear lower edges correspondingly with the said side. The frame 21 not only supports the plate 29 and receptacle 24, but has secured to it a crane or arm 34 from which the bucket or container 32 is suspended, it being the purpose that the bucket or container 32 shall travel with the frame 21 and receptacle 24 and have a substantially constant discharge through its outlet 35 into said receptacle.

I illustrate a printer's roller 36 on the machine, said roller being held between the spindles 14 and rotatable. The roller 36 shown comprises a stock 37, a body 38 which may be of sponge rubber, a skin of linen or the like 39 tightly inclosing said body and an outer coating 40, the application of said coating to the roller being one of the purposes of the present invention. The interior and body of the roller 36 may be of any suitable character, since one part of the invention comprises a method for applying a coating to a printer's roller regardless of the character of the body-portion of the same. I illustrate one construction of printer's roller, but will apply the coating 40 with the use of my invention on printers' rollers generally whether new rollers in the course of construction or old or damaged rollers requiring re-surfacing.

In the employment of my invention with the use of the machine shown the frame 21 carrying the receptacle 24 and container 32 will be moved to the right hand portion of the table or bed-plate 10, and the roller 36 to be treated will be secured between the spindles 14, and thereupon, after the adjustment of the receptacle 24 to said roller, the discharge from the bucket or container 32 will be opened to permit the flow of the coating-composition into the said receptacle, filling such receptacle to the top of the front end 26 thereof, and power will then be applied to the wheel 15 for the purpose of rotating the printer's roller and through the gear wheels 16, 17 the screw-shaft 18, the result being that during the rotation of the roller 36 the frame 21 will be caused to travel along the roller and toward, in the construction illustrated, the left hand end thereof. The receptacle 24 will be adjusted rather close against the body of the roller to be coated, so that during the travel of said receptacle said body may receive therefrom a thin coating of the solution-composition. After the receptacle 24 has traveled toward the left the full length of the roller 36, it will be returned to the right hand end of the roller and readjusted against the same and then caused to travel toward the left, leaving another thin coating of the composition material on the roller. This will be repeated as often as may be required for obtaining a coating 40 of the desired or requisite thickness. The composition-material in the bucket or container 32 is kept hot by means of a hot water jacket in the walls of said bucket, and hence the composition is kept liquefied and in a condition to flow into and overflow the receptacle 24. The overflow from the receptacle 24 passes to the drip-pan 20 as hereinbefore described. The sides 27 of the receptacle, owing to their inclination and being cut at their rear edges to partly fit the body of the roller, are important, in that the coating by reason of said construction becomes evenly applied to the roller and without streaking or leaving a spiral line on the roller. The relative proportions and formation of the front end 26 and sides 27 of the receptacle 24 are also important in that all overflow is kept under control and directed to the discharge opening 30, whence the overflow passes to the drip-pan 20. The presence of the blades or wings 33 to engage the surface of the roller as a trail after the receptacle 24, is important in that they aid in the production of a smooth uniform coating on the roller and without streaking or leaving lead lines in said coating. I do not wish to limit myself to the use of the blades or wings 33, but said blades or wings are of advantage and add to the efficiency of the machine. I prefer that the receptacle 24 be kept filled during the time the machine is in use so that at all times the roller 36 may throughout its length receive a substantially uniform layer of the material from said receptacle.

I have hereinbefore described the invention as employed for applying a coating to a printer's roller whether said roller was in the course of manufacture or an old roller requiring to be resurfaced. It is to be understood, however, that my invention is not limited to merely applying the exterior coating on a printer's roller, but may be employed for forming the entire roller of printer's roller or other suitable composition, and in that use of the invention the stock for the roller would be applied to the machine described and the receptacle carrying the melted composition caused to travel along the same a sufficient number of times to create a printer's roller of the requisite diameter.

The method constituting my invention will be substantially understood from the foregoing explanation and description without further detailed comment. The melted composition supplied to the receptacle 24 may vary from time to time if layers varying in character are to be made use of in building up or resurfacing the roller, and said receptacle will be adjusted outwardly from the roller as the latter increases in diameter regardless of what composition may be supplied thereto. The maintenance of a substantially uniform level of the body of melted composition in the receptacle 24 is distinctly advantageous and likewise it is advantageous that said body of composition engages only a portion of the circumference of the roller, since under such conditions the ribbon-like width of the composition taken by and spirally wound upon the roller to form a layer thereon is substantially uniform in character. The layers of composition taken by or applied to the roller are further rendered uniform in thickness by the rear edges of the bottom and following side of the traveling receptacle 24.

The machine shown in the drawings may be utilized for carrying my invention into effect but my invention is not confined to the employment thereof. Cross-reference is hereby made to my copending application No. 803,436 filed November 28, 1913 which describes and claims the machine shown and described herein.

What I claim as my invention and desire to secure by Letters Patent, is:

1. The method hereinbefore described of forming or completing a printer's roller by applying the composition, while in a melted state, in a layer or layers, as required, to the stock or the body already thereon, which consists in rotating the stock or roller-body in the presence of a body of the melted composition held against a portion of the same, causing a relative traveling movement between said stock or roller-body and said body of melted composition whereby a spirally wound ribbon or width of said composition is taken by said stock or roller-body, and rendering the ribbon-layer of composition, as taken by the printer's roller, of uniform outer surface.

2. The method hereinbefore described of forming or completing a printer's roller by applying the composition, while melted, in layers to the stock or body already thereon, which consists in rotating the stock in the presence of the melted composition held against a portion of the circumference of said stock or body, rendering the layer of composition taken by the roller uniform in thickness, and adjusting the relation of the melted composition to the roller as the latter increases in diameter.

3. The method hereinbefore described of forming or completing a printer's roller by applying the composition, while melted, in layers to the stock or body already thereon, which consists in rotating the stock, holding a body of the melted composition against a portion of the circumference of the stock or body thereon and during such rotation causing said body of melted composition to successively travel along the same, rendering each spiral ribbon or layer of composition taken by the roller for a layer thereon uniform in thickness, and adjusting the relation of the body of melted composition to the roller as the latter increases in diameter.

4. The method hereinbefore described of forming or completing a printer's roller by applying the composition, while melted, in layers to the stock or body already thereon, which consists in rotating the stock, holding a body of the melted composition against a portion of the circumference of the stock or body thereon and during such rotation causing said body of melted composition to successively travel along the same, rendering each spiral ribbon or layer of composition taken by the roller for a layer thereon uniform in thickness, wiping away the spiral lead line that may be left by the traveling body of melted composition, and adjusting the relation of the body of melted composition to the roller as the latter increases in diameter.

5. The method hereinbefore described of forming or completing a printer's roller by applying the composition, while melted, in layers to the stock or body already thereon, which consists in rotating the stock, holding a body of the melted composition against a portion of the circumference of the stock or body thereon and during such rotation causing said body of melted composition to successively travel along the same, rendering each spiral ribbon or layer of composition taken by the roller for a layer thereon uniform in thickness, maintaining the level of the body of melted composition during its travel substantially constant, and adjusting the relation of the body of melted composition to the roller as the latter increases in diameter.

Signed at New York city, in the county of New York and State of New York, this 9th day of December A. D. 1913.

SAMUEL CRUMP.

Witnesses:
ARTHUR MARION,
CHAS. C. GILL.